(12) United States Patent
Tan et al.

(10) Patent No.: US 10,990,104 B2
(45) Date of Patent: Apr. 27, 2021

(54) SYSTEMS AND METHODS INCLUDING MOTORIZED APPARATUS FOR CALIBRATING SENSORS

(71) Applicant: General Electric Company, Schenectady, NY (US)

(72) Inventors: Huan Tan, Clifton Park, NY (US); Todd William Danko, Niskayuna, NY (US); Brandon Stephen Good, Schenectady, NY (US); Charles Burton Theurer, Alplaus, NY (US)

(73) Assignee: General Electric Company, Schenectady, NY (US)

( * ) Notice: Subject to any disclaimer, the term of this patent is extended or adjusted under 35 U.S.C. 154(b) by 295 days.

(21) Appl. No.: 16/244,873

(22) Filed: Jan. 10, 2019

(65) Prior Publication Data

US 2020/0225674 A1    Jul. 16, 2020

(51) Int. Cl.
*G05D 1/02*    (2020.01)
(52) U.S. Cl.
CPC ......... *G05D 1/0219* (2013.01); *G05D 1/0242* (2013.01); *G05D 1/0274* (2013.01); *G05D 1/0285* (2013.01); *G05D 2201/02* (2013.01)
(58) Field of Classification Search
CPC .. G05D 1/0219; G05D 1/0242; G05D 1/0285; G05D 1/0274; G05D 2201/02;
(Continued)

(56) References Cited

U.S. PATENT DOCUMENTS 9,400,501 B2    7/2016  Schnittman
9,874,873 B2    1/2018  Angle et al.
(Continued)

FOREIGN PATENT DOCUMENTS

CN    105758426 A    7/2016
CN    106681330 A    5/2017
(Continued)

OTHER PUBLICATIONS

Castellanos et al.,"Multisensor fusion for simultaneous localization and map building", IEEE Transactions on Robotics and Automation, vol. 17, Issue: 6, pp. 908-914, Dec. 2001.

*Primary Examiner* — Mary Cheung
(74) *Attorney, Agent, or Firm* — Armstrong Teasdale LLP (57) ABSTRACT

A sensor calibration system includes a plurality of sensors and a user interface configured to receive user-provided locations of at least two sensors of the plurality of sensors. The sensor calibration system further includes a motorized apparatus including a drive system, at least one detector, and a localization system. The sensor calibration system further includes a controller communicatively coupled to the user interface and the motorized apparatus. The controller is configured to determine a whether each of at least two sensors is a key sensor based on the user-provided locations. The controller is configured to determine a path for the motorized apparatus based on the user-provided locations. The controller is further configured to determine a position of each sensor based on the location of the motorized apparatus when each sensor is detected by the at least one detector. The controller is further configured to relate the location of the motorized apparatus and the position of each sensor to a common origin.

20 Claims, 3 Drawing Sheets

(58) Field of Classification Search
CPC ............ G05D 2201/0207; G05D 1/028; G01S 5/0295; G01S 5/02; G01S 13/00; G01S 17/00
See application file for complete search history.

(56) References Cited

U.S. PATENT DOCUMENTS

| | | |
|---|---|---|
| 9,939,814 B1 | 4/2018 | Bauer et al. |
| 2016/0034158 A1* | 2/2016 | Livesay ............ G05B 19/41835 715/736 |
| 2016/0034329 A1* | 2/2016 | Larson ............... G05B 23/0283 702/188 |
| 2017/0238258 A1* | 8/2017 | Ramalho de Oliveira ................. H04W 52/0261 455/574 |
| 2018/0141567 A1* | 5/2018 | Surnilla ............ B60W 50/0225 |
| 2020/0334470 A1* | 10/2020 | Abeykoon ......... G06K 9/00771 |

FOREIGN PATENT DOCUMENTS

| | | |
|---|---|---|
| KR | 20180084267 A | 7/2018 |
| WO | 2017207312 A1 | 12/2017 |

\* cited by examiner

SYSTEMS AND METHODS INCLUDING MOTORIZED APPARATUS FOR CALIBRATING SENSORS

BACKGROUND

The field of the disclosure relates generally to a system for calibrating sensors and, more particularly to a system including a motorized apparatus that moves relative to sensors and determines positions of the sensors.

Sensors may be positioned in an environment to detect at least one characteristic of the environment and/or objects positioned in the environment. For example, at least some known sensors detect environmental conditions such as a temperature, a humidity, and an amount of light in the environment. In addition or alternatively, at least some known sensors detect characteristics of objects in the environment such as the location and number of objects in the environment. Moreover, sensors are sometimes included in "smart" or "intelligent" devices that communicate over a network to facilitate data collection. In addition, at least some known smart devices utilize applications that allow consumers to interact with the smart devices. For example, at least some known smart devices include sensors that detect a proximity of a user to the smart device and allow the smart device to transmit and/or receive information based on the proximity of the user to the smart device. Accordingly, each sensor should be precisely positioned within the environment and calibrated to provide accurate information. However, precisely positioning the sensors within the environment and recording the exact locations of the sensors increases the time required to install and set-up the sensors.

Accordingly, there is a need for a system that quickly calibrates sensors and provides precise locations of the sensors.

BRIEF DESCRIPTION

In one aspect, a sensor calibration system is provided. The sensor calibration system includes a plurality of sensors positioned in an environment. Each sensor of the plurality of sensors is configured to detect a characteristic of at least one of the environment and an object in the environment. The sensor calibration system also includes a user interface configured to receive user-provided locations of at least two sensors of the plurality of sensors. The sensor calibration system further includes a motorized apparatus including a drive system configured to move the motorized apparatus relative to the plurality of sensors. The motorized apparatus also includes at least one detector configured to detect the plurality of sensors and a localization system configured to determine a location of the motorized apparatus. The sensor calibration system further includes a controller communicatively coupled to the user interface and the motorized apparatus. The controller is configured to determine whether each of at least two sensors is a key sensor based on the user-provided locations. The controller is configured to determine a path for the motorized apparatus based on the user-provided locations. The controller is further configured to determine a position of each sensor based on the location of the motorized apparatus when each sensor is detected by the at least one detector. The controller is further configured to relate the location of the motorized apparatus and the position of each sensor to a common origin.

In another aspect, a motorized apparatus for calibrating a plurality of sensors is provided. Each sensor of the plurality of sensors is configured to detect a characteristic of at least one of an environment and an object in the environment. The motorized apparatus includes a drive system configured to move the motorized apparatus relative to the plurality of sensors. The motorized apparatus also includes at least one detector configured to detect each sensor of the plurality of sensors. The motorized apparatus further includes a localization system configured to determine a location of the motorized apparatus. The motorized apparatus also includes a communication component communicatively coupled to a controller and configured to send information relating to the detected sensors and the location of the motorized apparatus to the controller. The controller is configured to determine whether each of at least two sensors of the plurality of sensors is a key sensor based on user-provided locations. The controller is configured to determine a path for the motorized apparatus based on the user-provided locations. The controller is further configured to determine a position of each sensor based on the location of the motorized apparatus when each sensor is detected by the at least one detector. The controller is further configured to relate the location of the motorized apparatus and the position of each sensor to a common origin.

In yet another aspect, a method for calibrating a plurality of sensors is provided. The method includes receiving user-provided locations of at least two sensors of the plurality of sensors and determining whether each of the at least two sensors is a key sensor based on the user-provided locations. The method also includes moving a motorized apparatus relative to the plurality of sensors using a drive system of the motorized apparatus. The method further includes determining a path for the motorized apparatus based on the user-provided locations. The method also includes detecting each sensor of the plurality of sensors using at least one detector of the motorized apparatus. The method further includes determining, using a localization system, a location of the motorized apparatus when each sensor is detected. The method also includes determining a position of each sensor of the plurality of sensors based on the location of the motorized apparatus.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein provide systems and methods for calibrating sensors using a motorized apparatus. The motorized apparatus is configured to move relative to the sensors and includes at least one detector for detecting each sensor. The motorized apparatus also includes a localization system for determining locations of the motorized apparatus. A controller is configured to determine the position of each sensor based on the location of the motorized apparatus when each sensor is detected. In some embodiments, the controller compares one or more user-provided positions for one or more of the sensors to the determined positions of the sensor to relate a coordinate system to the determined positions and allow mapping of the sensors. As a result, the system is calibrated to include precise locations of each sensor in an environment. In addition, the calibration is not required to be completed during installation of the sensors and reduces the time that human installers are required to be onsite.

Figure 1:
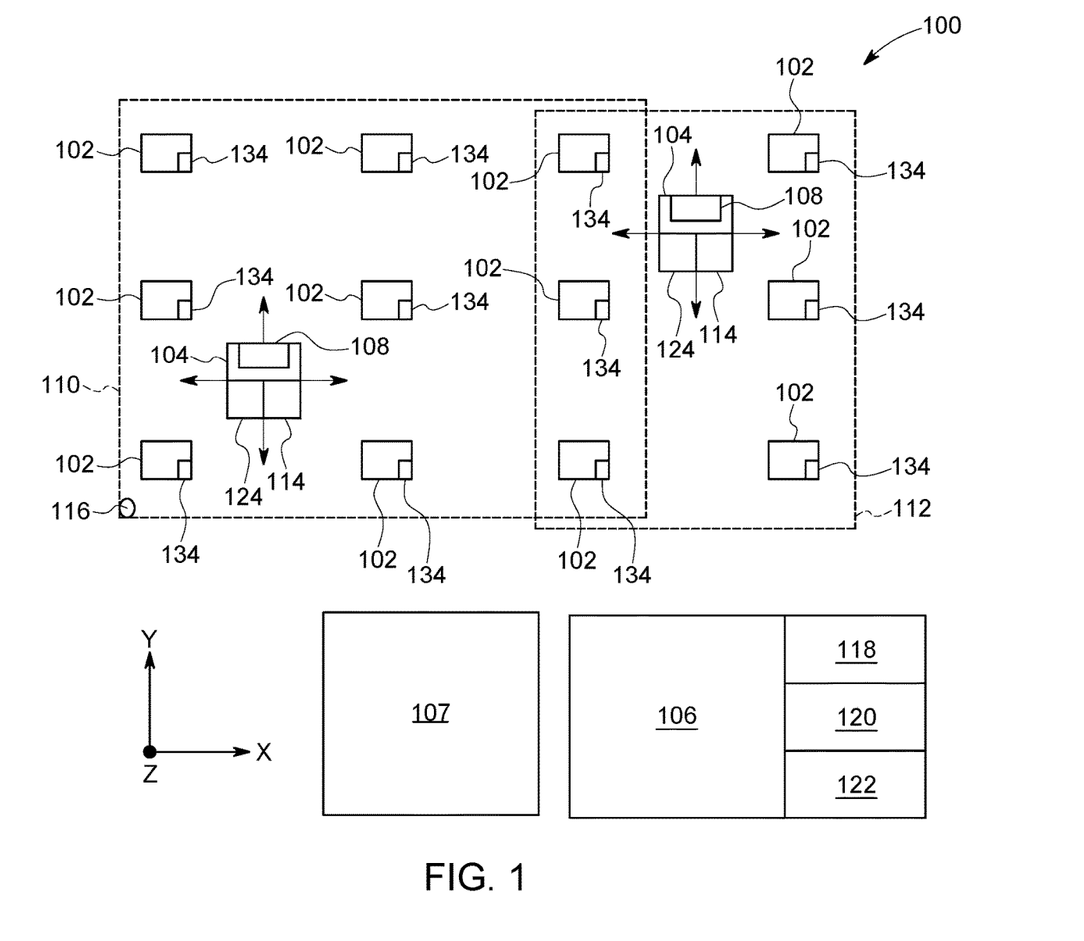
FIG. 1 is a schematic diagram of a system for calibrating sensors.

FIG. 1 is a schematic diagram of a system 100 for calibrating sensors 102. FIG. 1 includes a coordinate axis indicating X, Y, and Z directions. System 100 includes a plurality of sensors 102, at least one motorized apparatus 104, and a controller 106. In alternative embodiments, system 100 includes any component that enables system 100 to operate as described herein.

In the exemplary embodiment, sensors 102 are spaced from each other in the X-direction and the Y-direction. Specifically, sensors 102 are positioned in equally spaced rows in the X-direction and equally spaced columns in the Y-direction. In the exemplary embodiment, system 100 includes more than three sensors 102. Accordingly, sensors 102 are distributed throughout an environment and arranged to provide overlapping or adjacent ranges that substantially cover the environment. In alternative embodiments, sensors 102 are positioned in any manner that enables system 100 to operate as described herein. For example, in some embodiments, at least some sensors 102 are positioned randomly relative to other sensors 102.

Also, in the exemplary embodiment, sensors 102 are configured to detect a characteristic of at least one of the environment including sensors 102 and an object in the environment. For example, in some embodiments, sensors 102 detect a temperature, a humidity, an amount of light, a location of objects in the environment, and/or a number of objects in the environment. Moreover, sensors 102 may be included in "smart" or "intelligent" devices that communicate over a network and facilitate data collection and/or utilize applications to allow consumers to interact with the devices. In one embodiment, each sensor 102 is part of a light device, and sensors 102 are incorporated into a lighting system. In addition, sensors 102 provide and/or receive information based on the proximity of users to the devices. In some embodiments, sensors 102 include, for example and without limitation, acoustic sensors and/or optical sensors.

In addition, in the exemplary embodiment, system 100 includes a plurality (e.g., two) of motorized apparatus 104. Each motorized apparatus 104 is configured to move within the environment relative to sensors 102. In addition, each motorized apparatus 104 includes at least one detector 108 configured to detect sensors 102. Motorized apparatus 104 are configured to move autonomously along a path in proximity to a group of sensors 102. In the exemplary embodiment, a first group 110 of sensors 102 is detected by one motorized apparatus 104 and a second group 112 of sensors 102 is detected by another motorized apparatus 104. As a result, system 100 is able to calibrate sensors 102 in less time and provides improved accuracy as compared to systems with a single motorized apparatus 104. In the exemplary embodiment, first group 110 and second group 112 at least partially overlap each other, i.e., at least some sensors 102 are included in both first group 110 and second group 112. In alternative embodiments, system 100 includes any motorized apparatus 104 that enables system 100 to operate as described herein.

Moreover, in the exemplary embodiment, motorized apparatus 104 includes a localization system 114 configured to determine a location of motorized apparatus 104. In the exemplary embodiment, localization system 114 includes, for example and without limitation, a global positioning system (GPS) device, an inertial measurement unit (IMU), a light detection and ranging (LIDAR) device, a camera, an infrared device, an eddy current sensor, a sonar device, a radar device, and/or any other positioning sensor. Accordingly, localization system 114 enables steering of motorized apparatus 104 and/or facilitates determining positions of sensors 102. In alternative embodiments, motorized apparatus 104 includes any localization sensor that enables system 100 to operate as described herein.

Also, in the exemplary embodiment, controller 106 is communicatively coupled to motorized apparatus 104 and configured to determine a position of each sensor 102 based on the location of motorized apparatus 104 when each sensor 102 is detected by motorized apparatus 104. For example, controller 106 receives information including which sensors 102 have been detected by motorized apparatus 104, positions of sensors 102 relative to motorized apparatus 104, and the location of motorized apparatus 104. Accordingly, controller 106 is able to generate a map including positions of motorized apparatus 104 and sensors 102 relative to a common origin 116. In some embodiments, controller 106 receives the position of one or more sensors 102 from both of motorized apparatus 104. In such embodiments, controller 106 compares the two positions of the one or more sensors 102 to determine a more accurate position for each sensor 102. In alternative embodiments, controller 106 receives any information from motorized apparatus 104 that enables controller 106 to operate as described herein.

In addition, in the exemplary embodiment, controller 106 is configured to relate the determined positions of sensors 102 to a coordinate system of the environment. For example, a user interface 107 is configured to receive a user-provided location of at least one sensor 102 and provide the user-provided location to controller 106. Controller 106 is configured to relate the determined positions of all sensors 102 to the coordinate system of the environment based on the at least one user-provided location. In some embodiments, at least some of the user-provided locations correspond to sensors that are key sensors, e.g., sensors that are in a cluster or in a group having a relatively high density. Advantageously, in some embodiments, controller 106 requires only a few, e.g., three or less, user-provided locations to determine the positions of all sensors 102 on the coordinate system of system 100. In some embodiments, a user-provided location is provided for at least three sensors 102, and controller 106 determines the significance, e.g., whether each sensor 102 is a key sensor or not, for each of the at least three sensors 102 in order to calibrate all sensors 102. For example, to identify key sensors, controller 106 compares distances between sensors 102 and identifies at least two sensors 102 which have the smallest distance between them. Controller 106 stores the key sensors 102 for path planning and as reference points for relating the positions of sensors 102 to the coordinate system. In some embodiments, controller 106 compares the user-provided location and the determined position of each key sensor 102 on the coordinate system. In alternative embodiments, controller 106 determines positions of sensors 102 relative to the coordinate system in any manner that enables system 100 to operate as described herein.

Moreover, in the exemplary embodiment, controller 106 is further configured to determine a path for motorized apparatus 104 based on any operating parameter of system 100 and/or a detected characteristic of the environment. For example and without limitation, in some embodiments, controller 106 determines the path based on at least one of the determined positions of sensors 102 and the user-provided location. In particular, in some embodiments, controller 106 identifies key sensors and plans a path that passes key sensors. Also, the path may be determined for motorized apparatus 104 to cover areas identified as likely to have additional sensors 102. In some embodiments, the path for motorized apparatus 104 is determined prior to movement of motorized apparatus 104. In further embodiments, the path is at least partly determined in real-time as motorized apparatus 104 is moved within the environment.

Also, in the exemplary embodiment, each sensor 102 is configured to emit a unique signal. For example, in some embodiments, sensors 102 emit pulsed lights and/or sounds and the pulse pattern for each sensor 102 is unique. Controller 106 is configured to identify each sensor 102 based on the signal emitted by each sensor 102. In alternative embodiments, controller 106 is configured to identify sensors 102 in any manner that enables system 100 to operate as described herein. For example, in some embodiments, at least two sensors 102 are identical and controller 106 identifies the identical sensors 102 based on topography or objects in the environment around sensors 102.

In addition, in the exemplary embodiment, controller 106 includes a transceiver 118, a processor 120, and a memory 122. Transceiver 118 is communicatively coupled with each motorized apparatus 104 and is configured to send information to and receive information from a communication component 124 of each motorized apparatus 104. In the exemplary embodiment, transceiver 118 and communication component 124 communicate wirelessly. In alternative embodiments, motorized apparatus 104 and controller 106 communicate in any manner that enables system 100 to operate as described herein. For example, in some embodiments, controller 106 and motorized apparatus 104 exchange information through a wired link extending between motorized apparatus 104 and controller 106. In further embodiments, controller 106 is incorporated into motorized apparatus 104.

Figure 2:
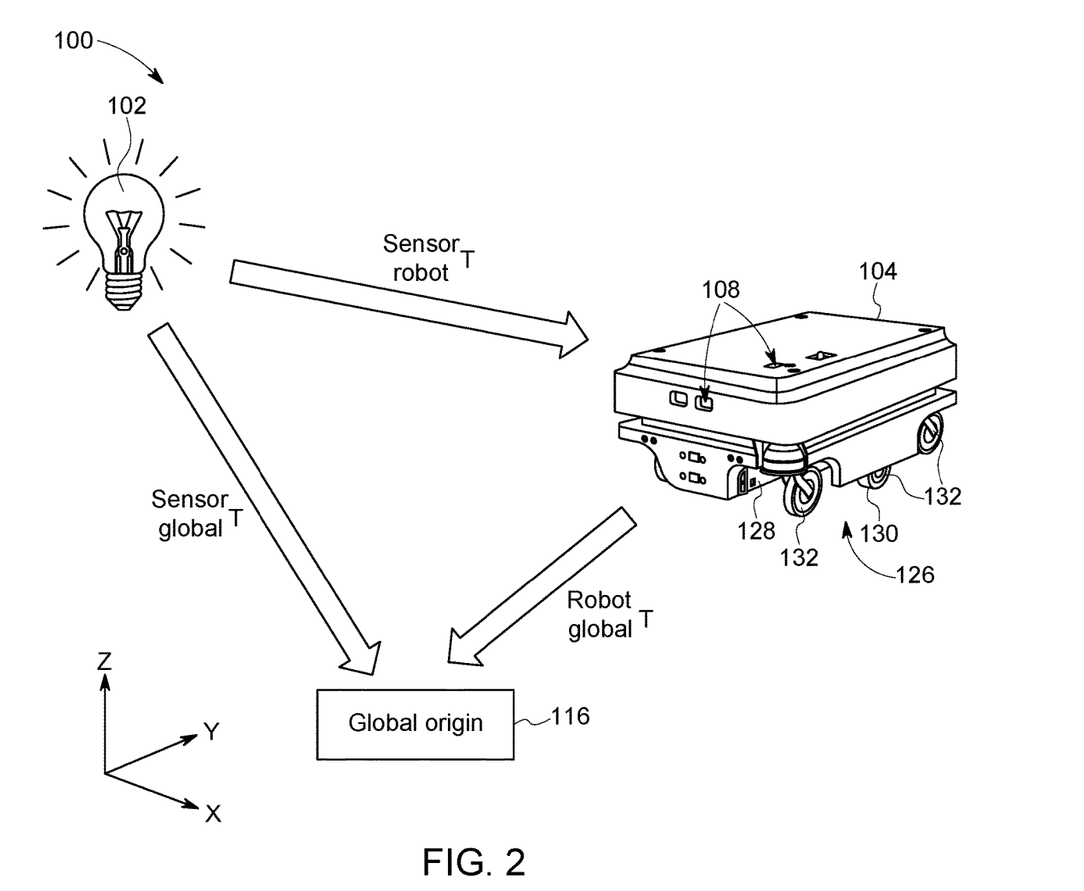
FIG. 2 is a schematic diagram of a sensor and a motorized apparatus of the system shown in FIG. 1.

FIG. 2 is a schematic diagram of sensor 102 and motorized apparatus 104 of system 100. FIG. 2 includes a coordinate axis indicating X, Y, and Z directions. Motorized apparatus 104 moves relative to sensor 102 in at least one of the X, Y, Z directions. In the exemplary embodiment, motorized apparatus 104 moves in the X-direction and the Y-direction relative to sensor 102. Specifically, motorized apparatus 104 is configured to move along a surface extending in the X-direction and the Y-direction. Sensor 102 is spaced from the surface in the Z-direction such that motorized apparatus 104 moves around underneath sensor 102. In this example, sensor 102 is a light coupled to a ceiling of a structure and motorized apparatus 104 is configured to move along the floor of the structure. In alternative embodiments, motorized apparatus 104 moves relative to sensor 102 in any manner that enables system 100 to operate as described herein. For example, in some embodiments, motorized apparatus 104 can be positioned at a distance above the surface and moves in the Z-direction, the X-direction, and/or the Y-direction relative to sensor 102.

Also, in the exemplary embodiment, motorized apparatus 104 further includes a drive system 126 configured to move motorized apparatus 104 relative to sensor 102. Drive system 126 includes a motor 128 and a plurality of drive mechanisms 130. Motor 128 is coupled to and drives drive mechanisms 130 to propel motorized apparatus 104 in at least one of the X-direction, the Y-direction, and the Z-direction. Specifically, in the exemplary embodiment, drive mechanisms 130 comprise wheels 132 that contact a surface and propel motorized apparatus 104 as motor 128 rotates wheels 132. In some embodiments, drive system 126 is a differential drive system 126 and is capable of rotating each wheel 132 at a speed different from the rotational speed of the other wheels 132. A power source (not shown), such as a battery, provides power for operation of motor 128 and any other components of motorized apparatus 104. In alternative embodiments, motorized apparatus 104 includes any drive system 126 that enables motorized apparatus 104 to operate as described herein. For example, in some embodiments, drive system includes a drive mechanism other than wheels, such as treads, tracks, worms, legs, and/or electromagnetic for fluidic locomotion mechanisms.

Moreover, in the exemplary embodiment, motorized apparatus 104 includes at least one detector 108 configured to detect sensor 102. Detectors 108 include, for example and without limitation, a LIDAR device, a camera, an infrared device, an ultrasound sensor, a sonar device, a radar device, and/or any other sensor. In alternative embodiments, motorized apparatus 104 includes any detector 108 that enables motorized apparatus 104 to operate as described herein.

In some embodiments, each sensor 102 includes a beacon or transmitter 134 (shown in FIG. 1) that is configured to transmit a unique signal. For example, in some embodiments, sensor 102 emits a light that pulses at a frequency undetectable by the human eye but recognizable by detector 108 of motorized apparatus 104. Accordingly, motorized apparatus 104 identify sensors 102 based on the signal emitted from each sensor 102. In alternative embodiments, sensors 102 are identified in any manner that enables system 100 to operate as described herein.

Figure 3:
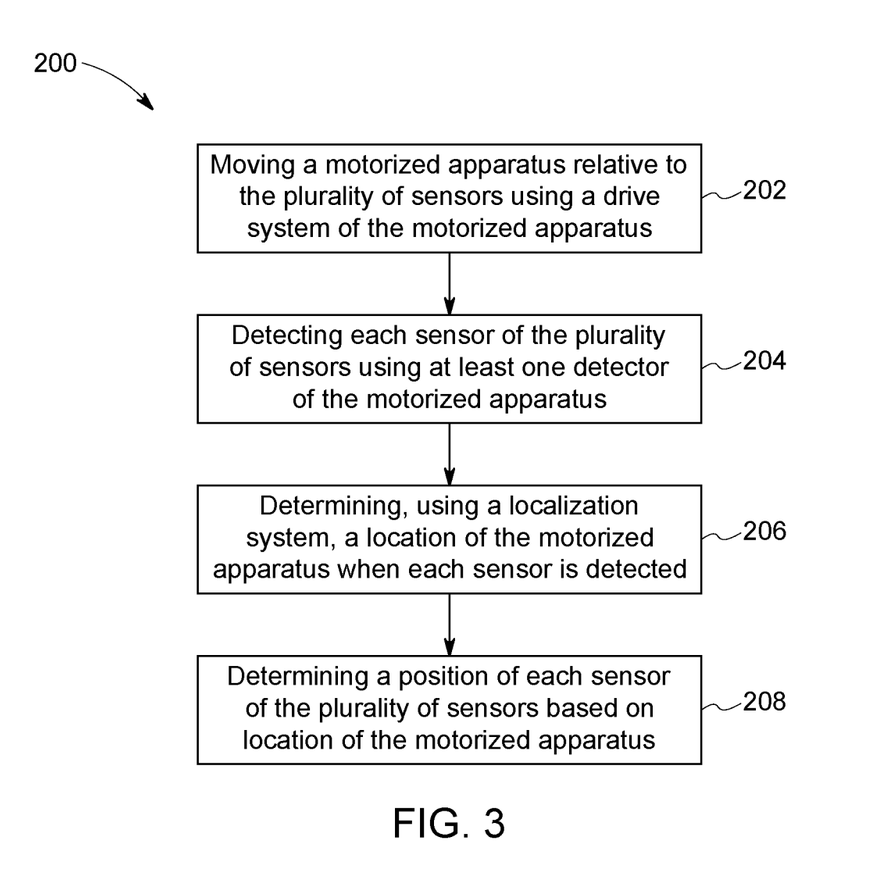
FIG. 3 is a flow diagram of a method for calibrating sensors using the system shown in FIG. 1.

FIG. 3 is a flow diagram of an exemplary method 200 for calibrating sensors 102 (shown in FIG. 1) using system 100 (shown in FIG. 1). In reference to FIGS. 1-3, method 200 includes moving 202 motorized apparatus 104 relative to sensors 102 using a drive system 126 of motorized apparatus 104 and detecting 204 each sensor 102 using at least one detector 108 of motorized apparatus 104. In some embodiments, a plurality of motorized apparatus 104 are moved relative to and detect sensors 102. Motorized apparatus 104 move in at least one of the X-direction, the Y-direction, and the Z-direction relative to sensors 102. In alternative embodiments, motorized apparatus 104 is moved relative to sensors 102 in any manner that enables system 100 to operate as described herein.

In addition, method 200 includes determining 206, using localization system 114, a location of motorized apparatus 104 when each sensor 102 is detected. For example, in some embodiments, localization system 114 locates motorized apparatus 104 relative to landmarks in the environment such as other sensors 102. In further embodiments, localization system 114 provides a global positioning system (GPS) coordinate for motorized apparatus 104. In alternative embodiments, localization system 114 provides a location for motorized apparatus 104 in any manner that enables system 100 to operate as described herein.

Method 200 further includes determining 208 a position of each sensor 102 based on the location of motorized apparatus 104. When each sensor 102 is detected, motorized apparatus 104 identifies the detected sensor 102 and determines a position of the detected sensor 102 relative to motorized apparatus 104. For example, in some embodiments, motorized apparatus 104 measures a distance between sensor 102 and motorized apparatus 104 in at least one of the X-direction, the Y-direction, and the Z-direction. Accordingly, controller 106 and/or motorized apparatus 104 is able to determine the position of detected sensor 102 in the global coordinate system based on the position of sensor 102 relative to motorized apparatus 104 and the determined location of motorized apparatus 104. In alternative embodiments, the position of each sensor 102 is determined in any manner that enables system 100 to operate as described herein.

In some embodiments, controller 106 builds a map of sensors by determining areas between sensors 102. For example, controller 106 determines triangular regions using positions of three adjacent sensors 102 and computes the areas of the triangular regions. In the exemplary embodiment, controller 106 determines triangular regions for positions of sensors 102 that are user-inputted and/or positions of sensors detected by motorized apparatus 104. Controller 106 sorts the triangular regions from user provided sensor locations and uses the computed and sorted areas to determine coverage of unexplored areas and path planning for movement of motorized apparatus 104. In particular, controller 106 uses areas from the user provided sensor locations to plan a path for motorized apparatus 104 to detect additional sensors 102. In addition, controller 106 uses the areas of triangle regions of detected sensors 102 to map the location and orientation of detected sensors 102 in global coordinates. The location and orientation of detected sensors 102 in the global coordinates may be continuously updated as sensors 102 are detected by motorized apparatus 104. In alternative embodiments, controller 106 maps sensors 102 in any manner that enables system 100 to operate as described herein.

In some embodiments, controller 106 includes a routine for calibrating a precise position of each sensor 102 detected in the environment. For example, in some embodiments, controller 106 triangulates the location and orientation of sensor 102 based on the location and orientation of motorized apparatus 104 in the environment and information sensed by motorized apparatus 104. Accordingly, controller 106 determines a predicted or estimated location of sensor 102. In some embodiments, motorized apparatus 104 projects the estimated location of sensor 102 into the environment and compares the pose of the estimated location of sensor 102 to the sensor 102 observed by motorized apparatus 104, for example, in a captured image. Controller 106 determines an error value based on any difference between the estimated location of sensor 102 and the observed location of sensor 102. Controller 106 is able to input the estimated location and the error value into an algorithm to optimize the pose of sensor 102. For example, in some embodiments, controller 106 uses a Kalman filter to optimize the location and orientation of each sensor 102.

In some embodiments, sensors 102 are detected by more than one motorized apparatus; and controller 106 determines more than one position for sensors 102. Using the two or more determined locations, controller 106 is able to provide a more precise location by using a Gaussian model. In alternative embodiments, controller 106 determines the position of sensors 102 in any manner that enables system 100 to operate as described herein.

An exemplary technical effect of the methods, systems, and apparatus described herein includes at least one of: (a) reducing the time to calibrate sensors; (b) increasing the accuracy of determining positions of sensors; and (c) increasing the reliability of information provided by the sensors.

Exemplary embodiments of methods, systems, and apparatus for calibrating sensors are not limited to the specific embodiments described herein, but rather, components of systems and/or steps of the methods may be utilized independently and separately from other components and/or steps described herein. For example, the methods, systems, and apparatus may also be used in combination with other systems requiring calibration of sensors, and are not limited to practice with only the systems and methods as described herein. Rather, the exemplary embodiment can be implemented and utilized in connection with many other applications, equipment, and systems that may benefit from using a motorized apparatus for calibrating sensors.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor calibration system comprising:
    a plurality of sensors positioned in an environment, each sensor of said plurality of sensors configured to detect a characteristic of at least one of the environment and an object in the environment;
    a user interface configured to receive user-provided locations of at least two sensors of said plurality of sensors;
    a motorized apparatus comprising:
        a drive system configured to move said motorized apparatus relative to said plurality of sensors;
        at least one detector configured to detect said plurality of sensors; and
        a localization system configured to determine a location of said motorized apparatus; and
    a controller communicatively coupled to said user interface and said motorized apparatus, wherein said controller is configured to:
        determine whether each of said at least two sensors is a key sensor based on the user-provided locations;
        determine a path for said motorized apparatus based on the user-provided locations;
        determine a position of each sensor based on the location of said motorized apparatus when each sensor is detected by said at least one detector; and
        relate the location of said motorized apparatus and the position of each sensor to a common origin.

2. The sensor calibration system in accordance with claim 1, wherein said controller is configured to determine whether each of said at least two sensors is a key sensor by comparing distances between said plurality of sensors and determining if the distance between said at least two sensors is the smallest distance between sensors.

3. The sensor calibration system in accordance with claim 2, wherein said controller is configured to compare the user-provided locations and the determined position of said at least two sensors to locate said at least two sensors in a coordinate system.

4. The sensor calibration system in accordance with claim 2, wherein said controller is further configured to determine a path for said motorized apparatus based on the determined position of each sensor and the user-provided locations.

5. The sensor calibration system in accordance with claim 1, wherein each sensor of said plurality of sensors comprises a beacon configured to emit a signal, and wherein said controller is configured to identify each sensor of said plurality of sensors based on the signal emitted by said beacon.

6. The sensor calibration system in accordance with claim 1, wherein said motorized apparatus is a first motorized apparatus, said sensor calibration system further comprising a second motorized apparatus including a drive system, at least one detector, and a localization system.

7. A motorized apparatus for calibrating a plurality of sensors, wherein each sensor of the plurality of sensors is configured to detect a characteristic of at least one of an environment and an object in the environment, said motorized apparatus comprising;
    a drive system configured to move said motorized apparatus relative to the plurality of sensors;
    at least one detector configured to detect each sensor of the plurality of sensors;
    a localization system configured to determine a location of said motorized apparatus; and
    a communication component communicatively coupled to a controller and configured to send information relating to the detected sensors and the location of said motorized apparatus to the controller, wherein the controller is configured to:
        determine whether each of at least two sensors of the plurality of sensors is a key sensor based on user-provided locations;
        determine a path for the motorized apparatus based on the user-provided locations;
        determine a position of each sensor based on the location of said motorized apparatus when each sensor is detected by said at least one detector; and
        relate the location of said motorized apparatus and the position of each sensor to a common origin.

8. The motorized apparatus in accordance with claim 7, wherein each sensor is configured to emit a unique signal, and wherein said motorized apparatus is configured to identify each sensor based on the signal emitted by the respective sensor.

9. The motorized apparatus in accordance with claim 7, wherein said drive system comprises a motor and a plurality of drive mechanisms.

10. The motorized apparatus in accordance with claim 7, wherein the motorized apparatus is further configured to receive a user-provided location of at least one sensor of the plurality of sensors.

11. The motorized apparatus in accordance with claim 10, wherein the motorized apparatus is further configured to detect the at least one sensor of the plurality of sensors to provide a determined position, wherein the controller is configured to compare the user-provided location and the determined position of the at least one sensor of the plurality of sensors to locate the at least one sensor of the plurality of sensors in a coordinate system.

12. The motorized apparatus in accordance with claim 11, wherein the communication component is configured to receive a path for said motorized apparatus from the controller, the controller is configured to determine the path based on at least one of the determined position of each sensor and the user-provided location.

13. A method for calibrating a plurality of sensors, said method comprising:
receiving user-provided locations of at least two sensors of the plurality of sensors;
determining whether each of said at least two sensors is a key sensor based on the user-provided locations;
moving a motorized apparatus relative to the plurality of sensors using a drive system of the motorized apparatus;
determining a path for the motorized apparatus based on the user-provided locations;
detecting each sensor of the plurality of sensors using at least one detector of the motorized apparatus;
determining, using a localization system, a location of the motorized apparatus when each sensor is detected; and
determining a position of each sensor of the plurality of sensors based on the location of the motorized apparatus.

14. The method in accordance with claim 13 further comprising emitting a signal from each sensor of the plurality of sensors, and identifying each sensor based on the emitted signal.

15. The method in accordance with claim 13, wherein the motorized apparatus is a first motorized apparatus and the plurality of sensors is a first plurality of sensors, said method further comprising:

moving a second motorized apparatus relative to a second plurality of sensors using a drive system of the second motorized apparatus; and
detecting each sensor of the second plurality of sensors using at least one detector of the second motorized apparatus.

16. The method in accordance with claim 13 further comprising receiving a user-provided location of at least one sensor of the plurality of sensors and comparing the user-provided location and the determined position of the at least one sensor of the plurality of sensors.

17. The method in accordance with claim 16 further comprising determining a path for the motorized apparatus based on at least one of the determined position of each sensor and the user-provided location.

18. The method in accordance with claim 13, wherein detecting each sensor of the plurality of sensors using at least one detector of the motorized apparatus comprises measuring a distance between each sensor of the plurality of sensors and the at least one detector.

19. The method in accordance with claim 18 wherein determining a position of each sensor of the plurality of sensors based on the location of the motorized apparatus comprises locating each sensor in a coordinate system based on the distance between each sensor of the plurality of sensors and the at least one detector and a location of said motorized apparatus relative to the coordinate system.

20. The method in accordance with claim 13 further comprising storing the determined position of each sensor of the plurality of sensors and relating the stored positions to a map.

* * * * *